(12) United States Patent
Roy et al.

(10) Patent No.: US 8,492,473 B2
(45) Date of Patent: Jul. 23, 2013

(54) COMPOUND FOR PURGING RESIDUAL POLYAMIDES FROM AN EXTRUDER

(75) Inventors: Sushanta Dhar Roy, Houston, TX (US); Viraj Triokekar, Oakville (CA); Salvatore D'Uva, Brantford (CA); Ed Hindy, Fayetteville, GA (US)

(73) Assignee: Ingenia Polymers Corp., Brantford (CA)

( * ) Notice: Subject to any disclaimer, the term of this patent is extended or adjusted under 35 U.S.C. 154(b) by 156 days.

(21) Appl. No.: 13/064,423

(22) Filed: Mar. 23, 2011

(65) Prior Publication Data

US 2012/0245269 A1  Sep. 27, 2012

(51) Int. Cl.
*B08B 9/02* (2006.01)
*B08B 9/00* (2006.01)

(52) U.S. Cl.
USPC ............ 524/523; 524/427; 524/451; 264/39; 134/22.14

(58) Field of Classification Search
USPC ........... 524/523, 427, 451; 264/39; 134/22.14
See application file for complete search history.

(56) References Cited

U.S. PATENT DOCUMENTS

| | | | |
|---|---|---|---|
| 3,869,525 A | 3/1975 | Miller | |
| 4,731,126 A | 3/1988 | Dixit et al. | |
| 5,139,694 A * | 8/1992 | Kmiec | 510/188 |
| 5,236,514 A * | 8/1993 | Leung et al. | 134/22.14 |
| 5,958,313 A * | 9/1999 | Yamamoto et al. | 264/39 |
| 6,022,420 A | 2/2000 | Eberle et al. | |
| 7,479,327 B2 | 1/2009 | Domine | |

FOREIGN PATENT DOCUMENTS

JP 07009531 A * 1/1995

OTHER PUBLICATIONS

JP 07009531 A, Jan. 1995, Machine Translation.*
JP 07009531 A, Jan. 1995, DERWENT Ab.*
http://www2.dupont.com/Elvaloy/en_US/products/elvaloy_ac_resins.html, May 1, 2006.*
Botros, Maged G. Botros Paper, Quantum Chemical Company (ANTEC 1996) (9 pp.).
Botros, Maged G. Purging Compound for Polyamides and Ethylene Vinyl Alcohol Copolymers. Journal of Plastic Film and Sheeting, vol. 12, No. 3, pp. 212-224, Jul. 1996.

* cited by examiner

*Primary Examiner* — Satya Sastri
(74) *Attorney, Agent, or Firm* — Dinesh Agarwal, P.C

(57) ABSTRACT

A purging compound for purging an extruder of polyamides or other polar thermoplastic resins for transitioning to the extrusion of a non-polar thermoplastic resin, includes a non-polar base polymer compounded with an ethylene-methacrylate copolymer, up to 15% of a mineral, and about 1% of a suitable antioxidant.

6 Claims, No Drawings

COMPOUND FOR PURGING RESIDUAL POLYAMIDES FROM AN EXTRUDER

FIELD OF INVENTION

This invention relates to purging compounds for cleaning melt extruders of residual polar polymers such as nylons to facilitate the transition to non-polar thermoplastic resins such as polyethylene.

BACKGROUND OF INVENTION AND PRIOR ART

Purging compounds have been used to clean out an extruder of molten resin for product changeover, for example from a specific resin dyed of one colour to the same resin in another colour, or from a resin of one chemical composition to a second resin of a different chemical composition.

The transition from a polar to a non-polar resin, as from nylon to polyethylene, presents a number of practical problems.

Nylon type resins, owing to their polar characteristics, have a strong affinity for metals in the extruder thus making it very difficult to clean the extruder in a reasonable time before transitioning to Polyethylene. This can result in a significant downtime thereby resulting in loss of productivity and higher cost for the manufacturer of films (converter).

Botros in his paper (ANTEC 1996) had described the use of a Purge compound, Plexar 909, an anhydride modified LDPE to purge polar resins from co-extrusion equipment. Botros describes the use of analytical techniques such as Intec Gel Analysis, Optical microscopy and FTIR to evaluate the purging efficiency.

In the Journal of Plastic Sheeting and Paper (Vol. 12, No. 3, 212-224, 1996), Botros describes the use of Plexar 909 to purge Polyamides and Ethylene Vinyl alcohol type polymers from the extruder.

U.S. Pat. No. 6,022,420 describes the use of a fluoropolymer to purge thermoplastic resins from the extruder.

U.S. Pat. No. 3,869,525 describes the use of a mixture of thermoplastic polymers, consisting of Polyethylene and Polyester for cleaning or purging the extruder.

U.S. Pat. No. 4,731,126 describes the use of thermoplastic polymers with hydroxymethyl-substituted carboxylic acids for purging polymeric residues.

U.S. Pat. No. 7,479,327 refers to the use of tie layer materials with ionomer-based films and sheets as skins on other materials.

A number of products are commercially available from chemical companies for use in the purging from extruders of more complex compounds, such as engineered thermoplastics, exemplified by the "Rapid Purge" purging compounds from Rapid Purge Chemical Company for purging resins such as EVAOH, EVA, Polyethylene.

A need exists for a purging compound which can effect a smooth transition of relatively short duration from polar to non-polar thermoplastics, particularly from polyamides such as Nylon-6 to polyethylene based films.

SUMMARY OF THE INVENTION

The present invention provides a masterbatch purging material which assists in the rapid transitioning from polyamides to polyolefins. Its chemical composition is such that the masterbatch itself is readily purged out once it has purged the polyamides from the extruder. The attendant reduction of transition time from polyamides to polyethylene affords costs savings to the film manufacturer (converter) and, importantly, reduces the wastage of materials, further lowering costs.

Masterbatch compositions according to the present invention comprise a major portion of non-polar base polymer selected from polyolefins, in particular polyethylene, polypropylene and blends thereof, compounded with an ethylene-methacrylate copolymer, in particular ELVALOY™ (DuPont). About 15% of a mineral such as calcium carbonate, silica (synthetic or natural) and talc, and a minor amount (about 1%) of a suitable antioxidant.

No theory is presented as to how the use of polymer in conjunction with a mineral and an antioxidant in purging compound according to the invention achieve their superior properties is presented, but the following are believed to be operative factors:

The additive resin in this masterbatch has an increased polarity that helps in having an improved filler acceptance.

The masterbatch due to the ethylene copolymer additive resin also has a higher thermal resistance which is an advantage in blends with Engineering resins such as Nylon.

The masterbatch also contains a mineral that helps further in imparting stability to film and aiding further to the process of purging.

The mineral can have additional benefits in improving the overall output for the films.

The ethylene copolymer resin along with the mineral which is used in the present invention helps to bind the masterbatch to the polyamides thus helping in removing the polyamides from the extruder.

The masterbatch in the present invention is compounded blend of two or more additives along with a base resin. Both the base and the additive resin can be processed within the normal processing temperature of polyolefins and other polar resins.

DETAILED DESCRIPTION OF THE INVENTION

Given below in the following sections are some definitions and examples which may help in the description of the invention.

"Additives": Chemicals and/or resins that due to their specific chemical characteristics, are capable of imparting distinct properties to the system in which they are introduced. An additive is usually one of the minor components of a multi-component polymer blend.

Resins include but not limited Polyethylene (LDPE, LLDPE, HDPE), Nylon (Nylon 6, 66), Tie resins (anhydride modified LLDPE), Ethylene Methyl Acrylate "Extruder": The term extruder and extrusion used herein refers to all types of melt extrusion operations and apparatus that are used for melting plastic polymer into molten form and then converting the same into a certain shape.

"Blown Film": Processing equipment used to convert resins and/or masterbatch to a film The word "film" refers to polymer that has been converted to a thin structure with thickness ranging from less than a mil to few mils.

"Melting point": It is the peak melting temperature of polymer that is measured by analytical tools such as differential scanning calorimetry ("DSC") or any other instrument.

"Wavenumber": It is the frequency at which various bonds in a chemical molecule come into resonance. Every chemical compound has a distinct chemical make up and bonds come into resonance at a different wavelength.

"Carrier polymer": It is the polymer used typically as the continuous phase that when combined with fillers, colorants or additives, will encapsulate them to form a masterbatch.

"Masterbatch": It is a concentrate of colorants or additives properly dispersed into a carrier polymer, which is subsequently blended into the base polymer rather than adding the filler, colorant or additive directly to the base polymer "Purge Masterbatch": Additives and resins that have been formulated to form a masterbatch that helps to clean or purge the extruder.

Preferred base polymers of the present include but not limited to polyolefins such as polyethylene, polypropylene and blends thereof.

The purge masterbatch of this invention includes additives known to those skilled in the art such as minerals, antioxidants and resins such as LLDPE and Ethylene methyl acrylate, such as Elvaloy®1224 AC.

Minerals used in the present invention include but not limited to Calcium Carbonate, Silica, Synthetic Silica and Talc Primary and secondary antioxidants are used in the formulation of the present invention.

Phenols (Primary Antioxidants) particularly useful in the present invention include, but are not limited to penterythritol tetrakis (3-(3,5-di-t-butyl-4-hydroxyphenol)propionate),octadecyl-3,5-Di-(tert)-butyl-4-hydroxyhydrocinnamate,1,3,5-tris(3,5-di-tert-butyl-4-hydroxybenzyl)-1,3,5-triazine-2,4,6 (1h,3h,5h)-trione,1,3,5-trimethyl-2,4,6-tis(3,5-di-tert-butyl-4-hydroxybenzuyl)benzene, Octadecyl-(3-3,-di-t-butyl-4-hydroxyphenol) e.g.:

(AO-76) Octadecyl-(3-3,-di-t-butyl-4-hydroxyphenol)

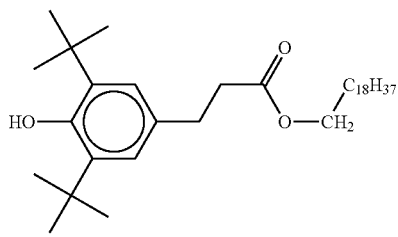

(AO-10) {penterythritol tetrakis (3-(3,5-di-t-butyl-4-hydroxyphenol)propionate

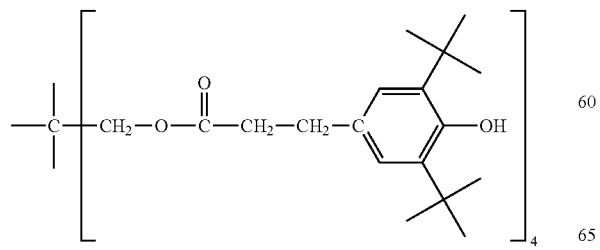

(AO-129) {2,2'-ethlidenebis (4,6-di-tert-butylphenol}

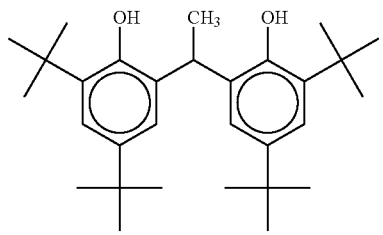

(AO-702) {4,4'-methylenebis(2.6-di-tertiary-butylphenol)}

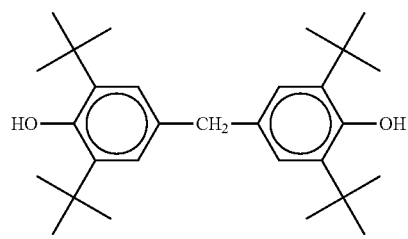

(AO-246) {2,4,6-tri-tert-butylphenol};

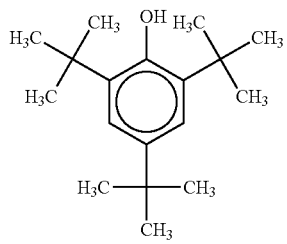

Phosphites (Secondary Antioxidants) that can be used in the present invention include, but are not limited tris-(2,4-di-t-butylphenyl)phosphite,tetrakis(2,4-di-tert-butylphenyl)[1,1-biphenyl]-4,4'-diylbisphosphonite, bis(2,4-di-t-butylphenyl) pentaerythritol diphosphite, bis(2,4-di-t-cumylphenyl) pentaerythritol diphosphite, tetrakis(2,4-di-t-butylphenyl) 4,4'-biphenylene diphosphonite, 2,4,6 tri-t-butylphenyl 2 butyl 2 ethyl 1,3 propane diol phosphite, distearyl pentaerythritol diphosphite, tris(nonylphenyl)phosphite and trilauryl trithio phosphite, e.g.

(AO-68): {tris-(2,4-di-t-butylphenyl)phosphite}

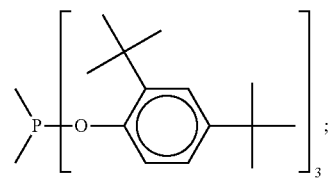

(AO-62): {bis(2,4-di-t-butylphenyl) pentaerythritol diphosphite}

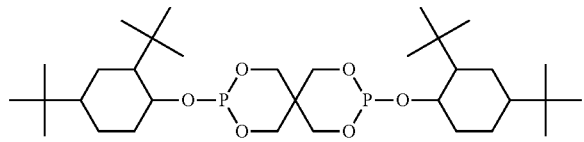 [SMILES: CC(C)(C)C1CCC(OP2OCC3(CO2)COP(OC2CCC(C(C)(C)C)CC2C(C)(C)C)OC3)C(C(C)(C)C)C1]

AO-641 {2,4,6 tri-t-butylphenyl 2 butyl 2 ethyl 1,3 propane diol phosphite}

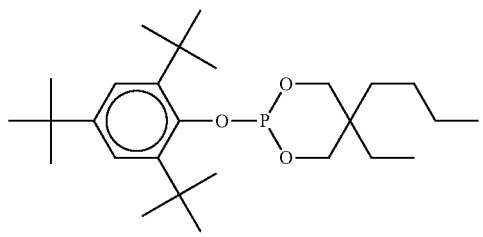

AO-PEPQ {Tetrakis (2,4-di-tert-butylphenyl)[1,1-biphenyl]-4,4'-diylbisphosphonite}

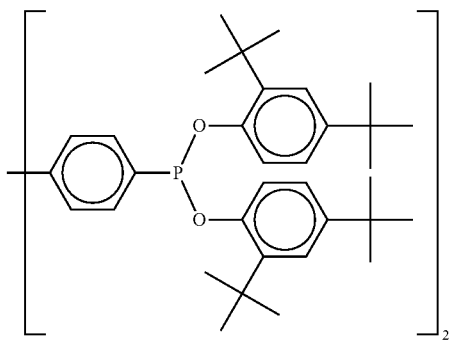

The masterbatch of the present invention can be used but not limited to processes including Blown film, Injection Molding The first step in this process is feeding the polymer additives to the said extruder. The different polymer additives can be either pre-blended or fed as a blend to the extruder or even metered independently. Pre-blending can be accomplished by weighing components and blending them together. Blending can be achieved by any means known in the art, including, but not limited to tumble blending, ribbon blending, hand mixing, low-intensity and high-intensity mixing. Metering additives independently can be achieved either by volumetric or loss-in-weight feeders.

The polymer additives or the blend can be flood fed or starve fed to the extruder. The extruder can be of any type, including, but not limited to, a single screw extruder, a twin screw extruder, a planetary extruder or any combination thereof. The extruder performs the function of shearing, mixing the additive or additive blends and melting or softening at least one component of the additive blend. The remaining unmelted particles that are subjected to shear and/or heat are finely dispersed in the melted additive.

The additive blend is converted into pellets downstream of the extruder. This can be accomplished by any method known in the art. Typically the additive blend is forced through a die, the strand can be cut directly at the die face or the strand can be pulled and cooled and subsequently cut into pellets.

During the manufacture of films on a blown film line, the purge masterbatch is introduced to the same extruder where polar resins such as polyamides are added. The extruder pressure is monitored before and after introducing the purge masterbatch.

While using the purge masterbatch the temperature of the zones where this masterbatch is introduced is kept the same as without using any purge in the same zones.

EXAMPLES

The purge masterbatch of this present invention was prepared on a twin screw extruder (ZSK-25; 42L/D Coperion).

The additive masterbatch thus produced was further added to a 5 layer blown film line. The 5 layer blown film line is used to make films that can have different end user applications.

A 5 layer blown film (Labtech Industries—20 mm, 4" die) was used. Films were made with Nylon (BASF Ultramid® B40-01) and Tie resin (Bynel 4164) in the core layers and LDPE (Novapol LFY 819A) on the outside. The overall output of the machine was between 50 and 60 lbs/hour. Nylon was present in the core layer (Layer C of A/B/C/D/E type co-ex film) and was 20% of the overall structure.

For evaluating the efficiency of the purge masterbatch, analytical tools such as Differential Scanning calorimeter (DSC-Perkin Elmer Jade DSC) and Fourier Transform Infra Red (FTIR-Nicolet 560 Magna) Spectrophotometer were used.

Two parameters were used to characterize the efficiency of the purge masterbatch. The first were the peaks in FTIR curves. Each chemical molecule has its characteristics FTIR curve which is different than others. The FTIR curves were monitored as a function of time. The other parameter was the melting point peak of the polyamide such as Nylon-6. The melting point was measured in the film samples collected in the beginning and the end of the run.

A parameter of significant importance was the extruder pressure after the addition of the purge masterbatch as it affected the overall the output of the process.

Another parameter of equal importance was the stability of the film (bubble stability) after introducing the purge masterbatch.

Table I below highlights the different masterbatch formulations:

TABLE I

| | Example 1 | Example 2 | Example 3 |
|---|---|---|---|
| LLDPE (20 MI: LL 5100.09 Exxon) | 77 | — | — |
| LLDPE (2 MI: LL 5002.09 Exxon) | — | 79 | 64 |
| Elvaloy ® 1224 AC (Dupont) | 20 | 20 | 20 |
| CaCO3 (Excal-3; Excalibur Minerals) | 0 | 0 | 15 |
| Antioxidant (Irganox B900) Ciba Geigy | 3 | 1 | 1 |

In example 1, 20% Elvaloy® 1224 AC was used as the polymeric additive. The antioxidant loading was 3% in the masterbatch.

In example 2, 20% Elvaloy® 1224 AC was used as the main polymeric additive. The Antioxidant loading was 1% in the masterbatch.

In example 3, 20% Elvaloy® 1224 AC, 15% of a mineral (CaCO3) and 1% of Antioxidant were added.

FTIR and DSC were used as the primary analytical tool to measure the efficiency of the purge masterbatch.

The extruder pressure was monitored before and after adding the purge masterbatch.

The bubble (film stability) and the appearance of the film were also monitored after introducing the purge masterbatch.

Tables and Graphs in the subsequent sections highlight the results and findings

Extruder Temperature Profile of Extruder C (5 layer Co-Ex Film (A/B/C/D/E)
Temperature Profile

TABLE II

| Feed Zone | Zone 1 | Zone 2 | Zone 3 | Zone 4 |
|---|---|---|---|---|
| (° F.) 400 | 440 | 460 | 460 | 460 |

FTIR

The film samples as made were analyzed by FTIR and subsequently by DSC to confirm the presence/absence of Nylon. FTIR is a powerful analytical tool and can be used to identify presence/absence of certain functional groups. Also, the method has high sensitivity to variations in polymer structure. Some characteristics peaks of Nylon-6 are summarized in the table below:

TABLE III

| Wavenumber (cm$^{-1}$) | Peak |
|---|---|
| 3300 | N—H |
| 3090 | N—H |
| 1630 | C=O |

In addition to these peaks, Nylon also has asymmetric C—H$_2$ stretch, symmetric CH$_2$ stretch peaks. However, since the system in this project, is a complex blend of resins such as PE, Tie-Resin (Bynel 4164), Purge masterbatch and Nylon, there will be an overlapping of certain peaks. The 3300 cm$^{-1}$ peak, which is a characteristic of Nylon, was used as a primary reference while comparing the different spectra's.

FTIR Findings

FTIR testing was done at different time intervals from the time of addition of the purge masterbatch to the extruder. Subsequently, the purge masterbatch was replaced by LDPE resin in the same extruder. The findings from FTIR are summarized in the table below:

TABLE IV

| Region of Film | Characteristic Peaks (cm$^{-1}$) | Functional Group/Polymer |
|---|---|---|
| Only Nylon | 3300 | Nylon |
| 4 minutes after adding Purge MB | 3300 | Nylon |
| 6 minutes after adding Purge MB | 3300, 875, 1740 | Nylon, Purge MB |
| 8 minutes after adding Purge MB | 3300, 875, 1740 | Nylon, Purge MB |

TABLE IV-continued

| Region of Film | Characteristic Peaks (cm$^{-1}$) | Functional Group/Polymer |
|---|---|---|
| 12 minutes after adding Purge MB | 875, 1740 | Purge MB |
| 2 minutes after adding LDPE | 875, 1740 | Purge MB |
| 10 minutes after adding LDPE | — | No Purge Peaks |

DSC

DSC was also done simultaneously on the film samples. The melting peak of Nylon-6 was of primary interest. DSC findings are summarized in following table:

TABLE V

| Region of Film | Nylon Melting Peak | Area under Melting Peak (mJ) | Δ H (J/g) |
|---|---|---|---|
| Only Nylon | Present | 14.19 | 1.49 |
| 6 minutes after adding Purge MB | Present | 4.18 | 0.51 |
| 8 minutes after adding Purge MB | Present | 0.36 | 0.046 |
| 12 minutes after adding Purge MB | Absent | 0 | 0 |

SUMMARY OF THE FINDINGS

Co-Ex films were made with Nylon-6. Subsequently, the efficiency of transition from Nylon to Polyolefins was evaluated by introducing the purge masterbatch.

Stable extruder pressure and a steady bubble were obtained for the entire process when films were made with Ingenia Masterbatch (Example 3 from Table I).

Table VI highlights the extruder pressure with only Nylon in the extruder and after adding Purge masterbatch (Example 3, Table 1). With Examples 1 and 2 of Table 1, lower extruder pressures than with only Nylon 6 in extruder and inadequate bubble stability were observed respectively. With Example 3, the purged film also had a partially opaque appearance.

TABLE VI

| | Extruder Pressures | |
|---|---|---|
| Time (Minutes) | Only Nylon in Extruder C Pressure (psi) | After adding Example 3 MB in Extruder C Pressure (psi) |
| 2.0 | 2500 | 2700 |
| 4.0 | 2450 | 2600 |
| 6.0 | 2510 | 2518 |
| 10.0 | 2575 | 2500 |
| 15.0 | 2520 | 2393 |

Efficiency of this purge masterbatch was evaluated subsequently. Films were made with Nylon in the core layer (5 layer structure) for almost 30 minutes. The film samples as collected during the run were tested by FTIR to check for the presence of Nylon. FTIR indicated a distinct peak at 3300 cm$^{-1}$ (N—H stretch band; characteristic of Nylon) thus confirming the presence of Nylon.

The purge masterbatch was subsequently introduced and samples were collected at regular intervals to monitor the efficiency of the purging. FTIR data on the respective film samples indicated a gradual lowering in the intensity of the peak at 3300 $cm^{-1}$. At 12 minutes, after the addition purge masterbatch, the Nylon peak at 3300 $cm^{-1}$ was no longer visible. This new masterbatch contains a polar entity and mineral filler. Chemical interaction between the polar functionalities in Nylon-6 and the purge masterbatch is believed to be responsible for the "scrubbing action" thereby resulting in Nylon being purged out from the extruder. The filler also helps in improving the melt viscosity thereby enhancing the stability of the bubble. The filler further enhances the scrubbing action of the masterbatch. The purge masterbatch has characteristic peaks at 875 $cm^{-1}$ and 1740 $cm^{-1}$. Table IV summarizes the findings from FTIR Once the Nylon was no longer observed, LDPE was introduced in the same extruder to find out the time taken to clean the extruder of the purge masterbatch. FTIR analysis was done simultaneously. FTIR indicated that after 10 minutes of LDPE addition, there were no more purge peaks in the extruder. This was confirmed by a decrease in the intensity of the filler peaks until 6 minutes followed by complete disappearance at 10 minutes after LDPE addition. Table IV summarizes the FTIR data In order to further supplement these findings, DSC was carried out. The data from DSC supported the findings from FTIR. The initial DSC of the film sample had a distinct melting peak for Nylon which starts to decrease in intensity with the addition of purge masterbatch and after 12 minutes of adding purge masterbatch, there was no melting peak due to Nylon. Table V summarizes the DSC findings.

We claim:

1. A purging compound for purging an extruder of polyamides or other polar thermoplastic resins for transitioning to the extrusion of a non-polar thermoplastic resin, consisting of:
   (i) a major portion of non-polar base polymer compounded with an ethylene-methacrylate copolymer;
   (ii) up to 15% of a mineral; and
   (iii) about 1% of a suitable antioxidant.

2. A purging compound according to claim 1, wherein said non-polar base polymer is selected from the group consisting of polyolefins.

3. A purging compound according to claim 2, wherein said non-polar base polymer is selected from the group consisting of, polyethylene, polypropylene and blends thereof.

4. A purging compound according to claim 2, wherein said mineral is selected from the group consisting of calcium carbonate, silica and talc.

5. A purging compound according to claim 4, wherein said antioxidant is a phenol or a phosphite.

6. In a process of purging an extruder of a polar thermoplastic resin after an extrusion run by passing a purging compound through the extruder, the improvement wherein said purging compound is a compound according to claim 1.

* * * * *